United States Patent [19]

Lund

[11] Patent Number: 5,025,988

[45] Date of Patent: Jun. 25, 1991

[54] AIRBORNE LIQUID SPRAYING SYSTEM FOR CROP SPRAYING

[76] Inventor: Maynard Lund, 409 East St., Ritzville, Wash. 99169

[21] Appl. No.: 536,786

[22] Filed: Jun. 12, 1990

Related U.S. Application Data

[63] Continuation-in-part of Ser. No. 258,663, Oct. 17, 1988, abandoned.

[51] Int. Cl.$^5$ .............................................. B64D 1/18
[52] U.S. Cl. ..................................... 239/171; 244/136
[58] Field of Search ............ 239/171, 575, 600, 590.3; 244/136

[56] References Cited

U.S. PATENT DOCUMENTS

| | | | |
|---|---|---|---|
| 1,997,669 | 4/1935 | Arcieri | 244/136 |
| 2,639,194 | 5/1953 | Wahlin | 239/575 |
| 2,979,273 | 4/1961 | Liebhart | 239/171 |
| 3,061,247 | 10/1962 | Hyde | 239/171 |
| 3,084,890 | 4/1963 | Hyde | 239/171 |
| 3,445,065 | 5/1969 | Waldrum | 239/171 |
| 3,484,062 | 12/1969 | Johnson | 239/171 |
| 4,231,520 | 11/1980 | Waldrum | 239/171 |
| 4,629,148 | 12/1986 | Perinet | 239/171 |

*Primary Examiner*—Andres Kashnikow
*Assistant Examiner*—Karen B. Merritt
*Attorney, Agent, or Firm*—Harry M. Cross, Jr.

[57] ABSTRACT

A spray distribution system for discharging liquid pesticides and the like from a crop-spraying aircraft includes a double spray header arrangement. One main header extends beneath the wings of the aircraft and is fitted with spray discharge nozzles only beneath the aircraft wings. An auxiliary header extends beneath the aircraft engine, forward of the main boom, and is fitted with spray discharge nozzles beneath the aircraft body. The auxiliary boom is located far enough forward of the main header that it is out of the prop blast region. Each spray discharge nozzle emits liquid through an elongated discharge tube that substantially prevents misting. The spray discharge nozzles are each mounted on a downcomer conduit thus being located sufficiently below the aircraft wing so as to further reduce turbulence around the emitted liquid. The nozzles may be modified so as. to accommodate more than one discharge tube.

**

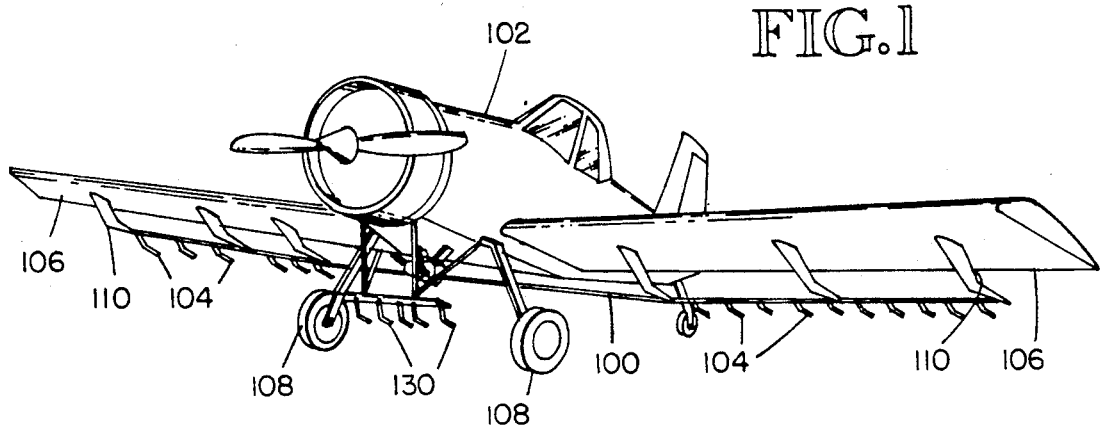
FIG. 1
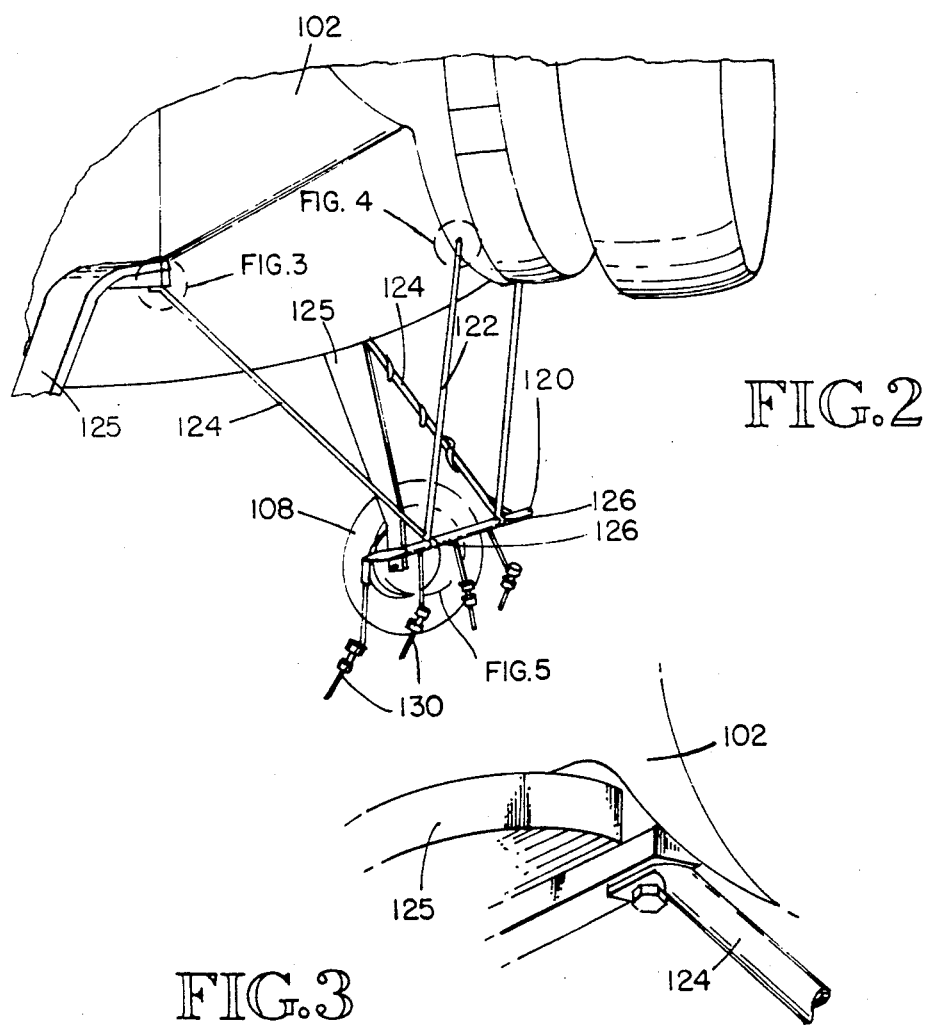
FIG. 2
FIG. 3

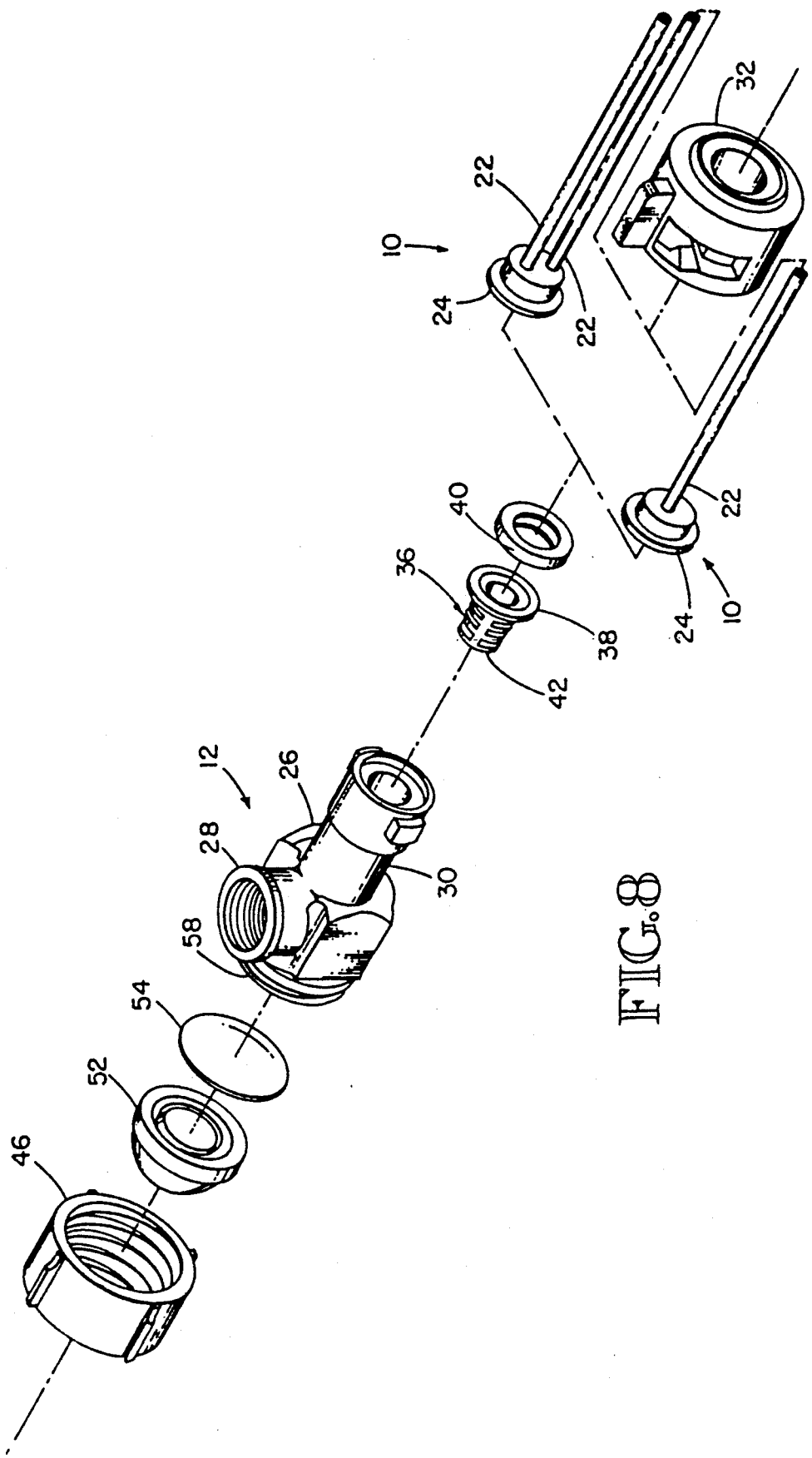

11

AIRBORNE LIQUID SPRAYING SYSTEM FOR CROP SPRAYING

RELATED APPLICATION

This application is a continuation-in-part of Ser. No. 258,663, filed Oct. 17, 1988 now abandoned.

FIELD OF THE INVENTION

This invention relates to devices intended for installation to crop-spraying aircraft for distribution of liquid pesticides and the like. More particularly, this invention relates to spray distribution systems including nozzles for discharging liquid pesticides and the like from crop-spraying aircraft.

BACKGROUND OF THE INVENTION

Heretofore, crop-spraying, aircraft-mounted, apparatus have commonly employed an underwing-mounted liquid distributor header conduit to which a plurality of orifice-type nozzles were connected. Typically, these nozzles discharge liquid pesticides and the like directly from the nozzle orifice apertures into the air trailing from the aircraft wing. The spray is emitted in a cone shape. Consequently, wind turbulence often causes the discharged liquid to mist rather than fall as droplets. The effects of misting are not desirable inasmuch as wind forces may cause the spray to drift off target.

Moreover, prop blast, which is a pulsating blast, destroys spray droplet size under the aircraft belly. The prop blast area extends under the aircraft belly between the main gear wheels. The typical spray header is mounted so that spray nozzles extend under the aircraft belly, behind the main gear wheels, from beneath one wing to the other wing. The resultant prop blast mistifies the spray droplets to the point where the spray is in an uncontrollable form. The spray from this region is subject to drift and also is blown back against the aircraft belly, tail and tail feathers.

SUMMARY OF THE INVENTION

The present invention provides an aircraft spray distribution system that includes a double spray header arrangement. One main header extends beneath the wings of the aircraft and is fitted with spray discharge nozzles only beneath the aircraft wings. An auxiliary header extends beneath the aircraft engine, forward of the main boom, and is fitted with spray discharge nozzles beneath the aircraft body. The auxiliary boom is located far enough forward of the main header that it is out of the prop blast region.

The present invention also provides a nozzle design that discharges liquid pesticides and the like through an elongated discharge tube that substantially prevents misting. The nozzle discharge tube emits the spray essentially longitudinally of the discharge tube in a narrow stream, rather than in a cone-shaped spray. The nozzle is adapted to fit existing aircraft-mounted spraying apparatus and to replace the conventional orifice in such apparatus. Consequently, wind forces around the nozzle will not mist the spray, hence a lot of fines are not produced that could drift off target. Furthermore, the present invention provides a downcomer conduit for mounting the nozzle of this invention sufficiently below the aircraft wing that turbulence around the emitted liquid is further reduced. Still further, the nozzle of this invention can accomodate one, two or three, and possibly more, discharge tubes, all connected to the same nozzle mounting for receipt of liquid from a single downcomer conduit.

BRIEF DESCRIPTION OF THE DRAWINGS

FIG. 1 is a perspective view of a crop-spraying aircraft with the double header arrangement of this invention mounted beneath the aircraft;

FIG. 2 is a partial side elevation view of the engine and main gear wheel region of the FIG. 1 aircraft showing the location of the auxiliary header forward of the main header and below the prop blast area;

FIG. 3 illustrates one of the auxiliary header mounting brackets;

FIG. 8 is a perspective view of the nozzle and its mounting, disassembled, illustrating how the nozzle element may be configured to have one or multiple discharge tubes fitted to the nozzle mounting.

DETAILED DESCRIPTION OF THE INVENTION

Figure 4:
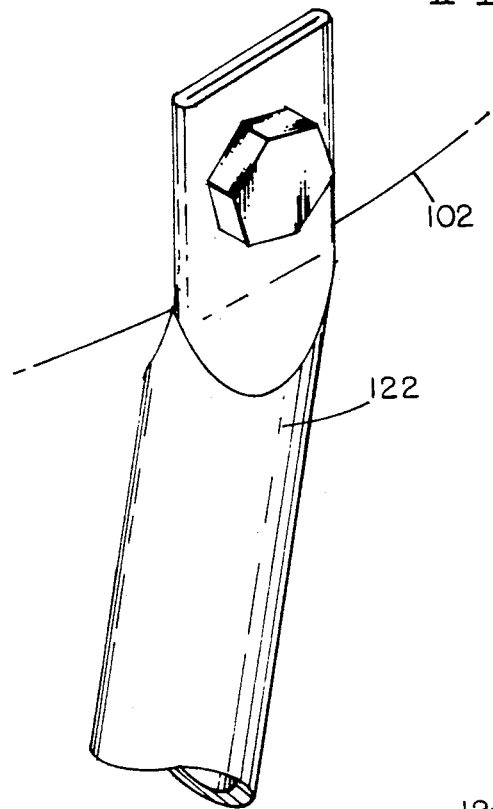
FIG. 4 illustrates another of the auxiliary header mounting brackets.

The spray distribution system of the present invention comprises a main distribution header 100 mounted underneath the wing of a crop-spraying aircraft 102. The main header extends across the underside of the aircraft from wing tip to wing tip and underneath the aircraft belly. The main distribution header 100 is ported for fitting spray distribution nozzle fittings 104 along the underside of each wing, but not underneath the aircraft belly. In general, a normal installation would provide such main nozzle fittings from the vicinity of each wing tip 106 to the vicinity of the each main gear wheel 108, and the region between the main gear wheels underneath the aircraft belly would not have provision for nozzle mountings. The nozzle fittings would be as described with respect to FIGS. 6–8. The main header 100 is suspended below the wings by a plurality of wing brackets 110 mounted to the underside of the wings. From the underside of the aircraft belly, a spray distribution line from the spray holding tank would connect to the main header 100 and to the forward auxiliary distribution header 120.

Figure 5:
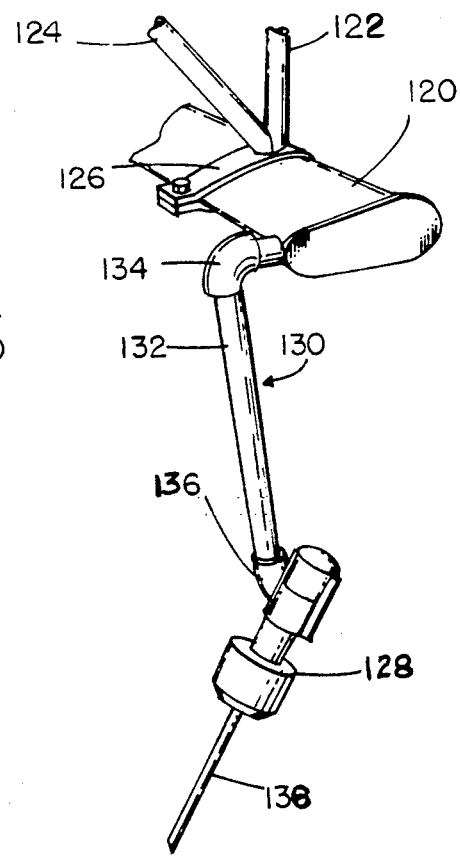
FIG. 5 illustrates the auxiliary header with a preferred spray nozzle mounted thereon.

The auxiliary distribution header 120 is located forward of the main gear wheels 108 and spans the region between the main gear wheels. The auxiliary header 120 is positioned below the aircraft engine by forward and rearward struts 122 and 124. The forward struts 122 are bolted to the engine cowling as shown in FIG. 4 and the rearward struts 124 are bolted to the main gear 125 as shown in FIG. 3. The forward and rearward struts are attached to header bands 126 that are extended around the auxiliary header 120. The auxiliary header 120 is thusly supported at two points and stabilized by the two strut pairs. The auxiliary header 120 has the shape of an airfoil with a plurality of nozzle fittings 130 spaced along and attached to the airfoil's trailing edge. As shown in FIG. 2, four such nozzle fittings are provided (more fittings may be required depending on the gallonage of liquid spray that the aircraft is required to put out). Each nozzle fitting comprises a downcomer conduit 132 attached to the header 120 by means of an elbow connection 134, a nozzle body 128 attached to the lower end of the downcomer conduit by another elbow connection 136, and a nozzle element 138 extending rearward from the nozzle body 128. The internal configuration of each nozzle element is as described with reference to FIGS. 6–8. In the preferred from of the invention, the nozzle body is oriented downward at an angle of 45 to 50 degrees so that the nozzle element 138 assumes that downward angle. Angling the nozzle elements downward at this angle facilitates dispersion of liquid spray droplets so that the overall spray pattern that is produced from the main and auxiliary spray headers is consistent across the spray distribution system. If a greater width of the spray pattern issuing from the auxiliary header is required, so as to insure that the auxiliary spray pattern completely spans the gap left by the main header, the outermost nozzle fitting (such as the one shown in FIG. 5) can be angled outward by adjusting the orientation of the elbow connections 134 and 136. This could be required in aircraft installations where the auxiliary header is not long enough to span the width between the pain gear wheels. The intermediate nozzle fittings would usually be oriented vertically downward from the auxililary header 120. In a preferred installation, the auxiliary header would be positioned from 18–20 inches above the ground when the aircraft is at a stand still, and the nozzle element tips would be extended to within 4–10 inches above the ground. For most aircraft propeller lengths, this relative positioning would be sufficient to insure that liquid spray issuing from the nozzle elements would fall clear of the prop blast.

Figure 6:
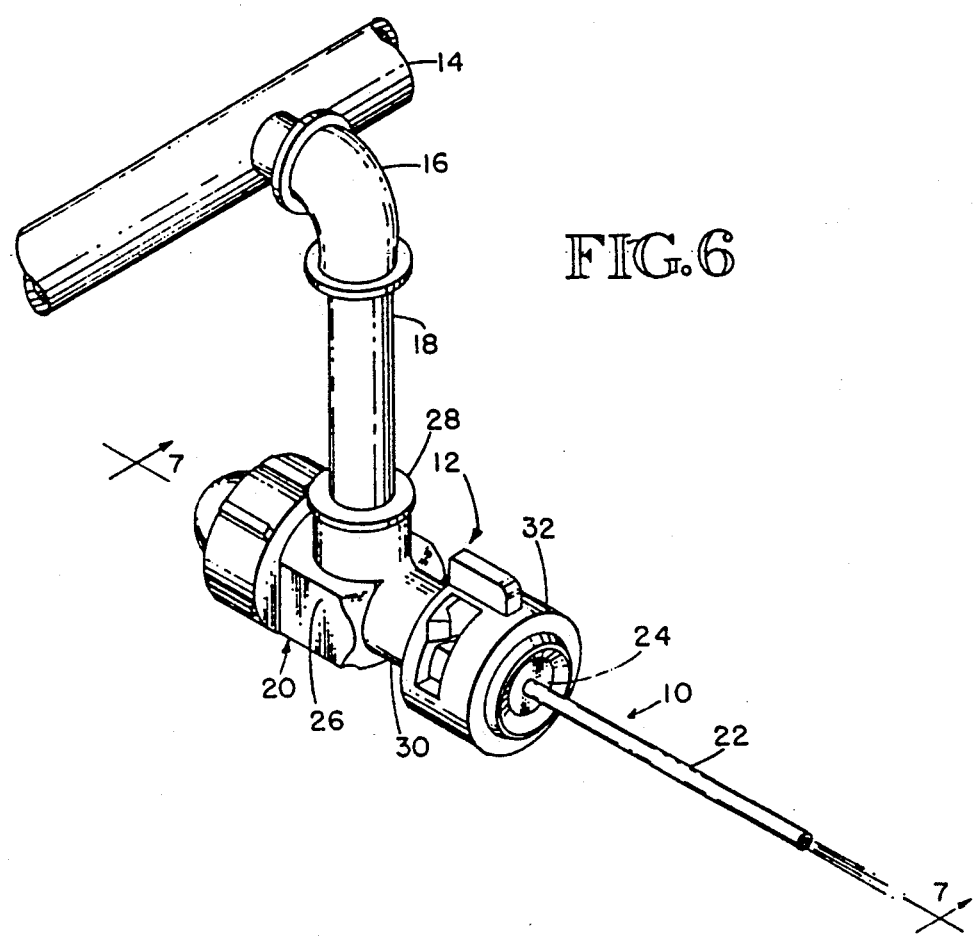
FIG. 6 is a perspective view of one embodiment of the preferred single discharge tube nozzle configuration is mounted to a boom header.
Figure 7:
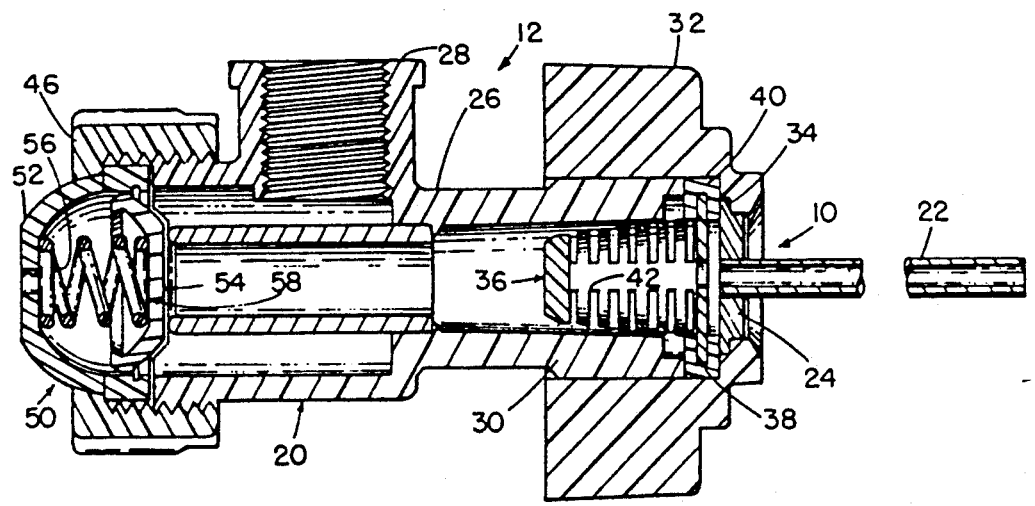
FIG. 7 is a cross-section view of the nozzle and its mounting, taken along the line 7—7 of FIG. 5.

The nozzle fittings of this invention, as shown in greater detail in FIGS. 6–8, each comprise a nozzle element 10 and a nozzle mounting 12 that connects the nozzle in liquid fluid communication with a liquid distribution header conduit 14. The nozzle mounting shown includes an elbow connection 16 to the header tube 14, a downcomer conduit 18 and a pressure-activated on/off valve 20. The nozzle element 10 is attached to the outlet from the valve 20. The valve 20, alternately, could be attached to the opposite end of downcomer conduit 18. In such a case the downcomer conduit would be provided with a right angle turn at its lower end to extend rearwardly of the aircraft wing so that the general orientation of the nozzle element 10 would be as displayed.

The nozzle element 10 comprises at least one liquid discharge tube 22 and a mounting disk 24. The tube 22 is fitted into an axial bore through the disk. The disk is machined to provide an annular rim designed to seat within the valve 20. The inner end of the tube 22 is flush with the inner face of the disk. The tube shown in FIG. 7 extends axially outward a relatively substantial distance from the disk. The tube 22 is fabricated from stainless steel and may have an inner diameter between about 0.025–0.160 inches. This diameter range yields a properly sized emitted stream for airborne crop-spraying operations.

The nozzle mounting valve 20 comprises a valve body 26, a liquid inlet 28 threaded for mounting to the downcomer conduit 18, and a liquid outlet 30. The outlet 30 comprises a mounting collar 32 cooperatively designed with the outlet end of body 26 to be detachably connected to the body 26. The collar 32 has an axial aperture therein provided with an annular seat 34 against which the rim of disk 24 seats. The aperture in collar 32 has approximately the same diameter as that of disk 24. Disk 24 is fitted into the aperture of collar 32 and seated against the collar seat 34 as shown in FIG. 7. The outlet 30 also comprises a filter 36, positionable in the valve body as shown, having an outer end flange 38 about which liquid seal collar 40 is secured. The filter body 42 is small enough to fit within the interior of body 26 and the seal carrying flange 38 bears against the end of body 26. Locking collar 32 is provided with an additional concentric rim which bears against the seal carrying flange 38 when locked into the position shown in FIG. 7. When locked into that position, the collar 32 wedges the inner peripheral rim of disk 24 against the seal 40 to make a liquid-tight connection between the valve body 26 and the nozzle element 10. The filter flange has an axial aperture aligned with the discharge tube 22 as shown. Liquid flows from the valve liquid inlet 28, through the valve body into the filter and out through the filter axial aperture into the discharge tube 22. The liquid is emitted in the form of a longitudinal stream, and not as a cone-shaped spray. Consequently, the stream maintains its integrity and wind forces surrounding the nozzle will not cause the stream to mist or break up into "fines".

The valve body depicted incorporates a pressure-sensitive mechanism 50 designed to close off an inner body passage 44 from the valve body inlet 28. This mechanism includes an end cap 52 threadedly connected to the valve body 26 by collar 46, a closure membrane 54 confined about its periphery between the valve body and the end cap 52, and a coil spring 56 fitted between the end cap and a membrane actuator 58. The spring 58 urges the actuator 58 against the membrane 54 toward the open end of passage 44, tending to seal passage 44 form the valve inlet 28. When a spraying operation is to cease, the pressure of the liquid supply through header conduit 14 is reduced so that the combined ambient air pressure and spring force can seal passage 44 from the valve inlet. This action will prevent residual liquid in the system from leaking out through the valve body. It serves as an anti-drip preventative.

The nozzle element disk 24 may mount additional discharge tubes as shown in FIG. 8. Preferably up to three such tubes may be employed. The disk, in such a case, would be provided with as many bores as discharge tubes. One of these bores might be axial but all might be non-axial, depending on manufacturing considerations. The bores may or may not be longitudinal. One or more of the discharge tubes could be oriented to extend acutely outward from the mounting disk axis so that their respective contributions to the combined liquid output stream would diverge from one another, thus providing a better spray distribution from each nozzle. This arrangement can provide the equivalent of a conical distribution pattern without creating individual cone-shaped sprays that could degenerate, as a result of surrounding wind forces, into a mist that might drift off target.

While the preferred embodiments of the invention have been described herein, variations in the design may be made. The scope of the invention, therefore, is only to be limited by the claims appended hereto.

The embodiments of the invention in which an exclusive property is claimed are defined as follows:

1. An aircraft-mounted liquid spray distribution for discharging an agricultural spray liquid from beneath a propeller-driven aircraft having a forward-mounted engine and propeller and being provided with a supply of spraying liquid and means to deliver said liquid to spray liquid distribution means and to dispense the same from spray nozzles without interference from prop blast emitted by the forward-mounted aircraft propeller, said distribution means comprising a main header means supported beneath the wings of said aircraft and extending substantially from wingtip to wingtip, an auxiliary header means supported beneath the aircraft engine forward of said main header and extending across the aircraft belly region, a plurality of spray discharge nozzle means fitted to said main header means along the length thereof except across the region beneath the aircraft belly whereby spraying liquid may be discharged therefrom substantially from wingtip to wingtip exclusive of the region beneath the aircraft belly, and a second plurality of spray discharge nozzle means fitted to said auxiliary header means along the length thereof whereby spraying liquid may be discharged therefrom essentially beneath the aircraft belly, said auxiliary header means and the nozzle means associated therewith being so arranged and positioned with respect to the aircraft propeller whereby spray liquid is discharged therefrom below the aircraft propeller prop blast region to combine with spray liquid dispensed from said main header means to form a unitary spray pattern unaffected by prop blast.

2. The system of claim 1 wherein said auxiliary header means comprises an elongated header conduit positioned beneath the aircraft engine and crosswise to the longitudinal axis of the aircraft, and a plurality of struts attached to said aircraft and connected to said header conduit to suspend said header conduit a predetermined distance beneath said engine; and wherein said second plurality of nozzle means comprises a plurality off discharge spray nozzles each connected to said header conduit by means of downcomer conduits and suspended below said header conduit whereby the position of said nozzles relative to the aircraft propeller is clear of the prop blast region.

3. The system of claim 2 wherein each of said spray nozzles comprises a nozzle element having at least one elongated liquid discharge tube for discharging a longitudinal stream of liquid and a mounting disk having a bore therethrough for each discharge tube provided, and a nozzle mounting having a liquid inlet and a liquid outlet with said mounting disk connected to said outlet in fluid communication with said inlet, said downcomer conduit being adapted to connect said nozzle element to said header conduit.

4. The system of claim 3 wherein said downcomer conduit is adapted to be connected directly said header conduit at one end and connected to said nozzle mounting at its other end.

5. The system of claim 4 wherein said nozzle mounting includes a nozzle element-mounting collar and a body having an interior through which liquid flows to said nozzle element, and said disk includes an annular rim which is engaged by said collar to attach said nozzle element to said nozzle mounting with said discharge tube in fluid communication with the interior of said body.

6. The system of claim 5 wherein said nozzle element includes at least two discharge tubes fitted to said nozzle element disk, said tubes extending acutely outward from the axis of said disk.

7. The system of claim 5 wherein said nozzle mounting includes an internal annular liquid seal element confined between said disk and said body when said collar is attached to said body.

8. The system of claim 3 wherein each nozzle element is oriented downwardly and rearwardly at an angle of between about 45–50 degrees whereby dispersion of liquid spray droplets is facilitated to produce a consistent spray distribution across the width of the distribution system.

* * * * *